United States Patent [19]

Yamada

[11] 4,351,602
[45] * Sep. 28, 1982

[54] ELECTROSTATIC PRINTER
[75] Inventor: Yoshihiro Yamada, Chiba, Japan
[73] Assignee: Tokyo Shibaura Denki Kabushiki Kaisha, Kanagawa, Japan
[ * ] Notice: The portion of the term of this patent subsequent to Jul. 1, 1998, has been disclaimed.
[21] Appl. No.: 171,478
[22] Filed: Jul. 23, 1980
[30] Foreign Application Priority Data
Jul. 27, 1979 [JP] Japan .......................... 54-103693[U]
[51] Int. Cl.³ ..................... G03G 15/00; G03G 21/00; G03B 27/00
[52] U.S. Cl. ...................................... 355/3 R; 355/1; 355/15
[58] Field of Search .............. 355/1, 3 R, 15

[56] References Cited
U.S. PATENT DOCUMENTS
3,641,605  2/1972  Lindsay .............. 355/15 X
3,890,038  6/1975  Ichikawa ............. 355/1
4,025,181  5/1977  Menon et al. ........ 355/15 X
4,074,217  2/1978  Yanagawa ........... 355/1 X
4,277,160  7/1981  Yamada .............. 355/3 R FOREIGN PATENT DOCUMENTS
49-125038  11/1974  Japan .
53-118534  9/1978  Japan .

Primary Examiner—Fred L. Braun
Attorney, Agent, or Firm—Schuyler, Banner, Birch, McKie & Beckett

[57] ABSTRACT

An electrostatic printer including a movable photosensitive drum, an OFT unit having a cathode ray tube (CRT) for transmitting an optical image to the photosensitive drum and an optical plate connected to the CRT and located a fixed distance from the photosensitive drum, a developing unit for developing the electrostatic image by application of toner to the photosensitive member, a transfer unit for transferring the developed electrostatic image to paper, a transparent film provided between the photosensitive drum and the optical fiber plate such that it covers and contacts the optical plate. Accordingly, the transparent film is moved in a direction to bring a clean film portion into position facing the optical plate before the formation of the electrostatic image.

3 Claims, 5 Drawing Figures

ELECTROSTATIC PRINTER

BACKGROUND OF THE INVENTION

The present invention relates to an electrostatic printer and in particular to a non-impact electrostatic printer which uses an OFT unit.

An OFT unit in a non-impact electrostatic printer is a device for transmitting an optical image to a photosensitive drum to form an electrostatic image. The OFT unit comprises a cathode ray tube and an optical fiber plate or head plate. This head plate, which is approximately 5 mm thick, is composed of a bundle of glass fibers normally having a diameter of approximately 20 μm. The head plate is joined to the surface of the cathode ray tube and it is located a slight distance of 0.1 to 0.2 mm away from the surface of the photosensitive member. Because a slight amount of static electricity is formed on the head plate, toner particles are attracted to the surface of the head plate to contaminate the head plate. The toner which adheres to the head plate prevents the formation of a clear image on the photosensitive member.

Different techniques have been employed in the prior art to prevent the surface of a head plate from being contaminated with toner particles. For example, Japanese Patent Disclosure No. 49-125038 issued on Nov. 29, 1974 and Japanese Patent Disclosure No. 53-118534 issued on Sept. 20, 1978 disclose a transparent film between the surface of the photosensitive drum and the head plate. The transparent film is moved relative to the photosensitive drum. In addition, in the above Japanese Patent Disclosure No. 49-125038, a cleaning liquid is applied between the film and the photosensitive drum. However, since the cleaning liquid must flow between the photosensitive drum and the film, the location of the OFT unit is greatly restricted and the photosensitive drum must have a greater diameter. The apparatus in this latter patent disclosure also requires a cleaning liquid dispenser, a cleaning liquid collector and a voltage application device for applying a voltage to the cleaning liquid. As a result, the apparatus is large, complicated and cumbersome. On the other hand, in Japanese Patent Disclosure No. 53-118534, cleaning plates are required for cleaning the transparent film. These cleaning plates suffer several of the same disadvantages discussed above with respect to the cleaning liquid of the apparatus in Japanese Patent Disclosure No. 49-125038.

In the apparatus described in both the above Japanese patent disclosures, the transparent film is subject to sagging or elongation if a certain period of time expires before the next printing cycle of the electrostatic printer. Also, the film in these disclosures touches the surface of the photosensitive drum which causes contamination of the film.

SUMMARY OF THE INVENTION

It is an object of this invention to provide an electrostatic printer which prevents the head plate of an OFT unit from being contaminated by the toner so that a clear image can be obtained. It is an additional object to provide an electrostatic printer which is simple in construction and operation.

It is a further object of this invention to provide an electrostatic printer which will prevent the reduction of copying quality due to contamination of the surface of a head plate of a OFT unit even when time elapses between the feeding of transparent film to the head plate and the start of the next printing cycle.

The present invention is directed to an electrostatic printer having an OFT unit. The OFT unit comprises a cathode ray tube and an optical fiber plate or head plate connected to the cathode ray tube. A transparent film is provided between the photosensitive drum of the electrostatic printer and the head plate such that it covers and contacts the head plate. The transparent film is repeatedly moved past the head plate to place clean film between the head plate and the photosensitive drum before formation of a electrostatic image on the photosensitive drum.

DESCRIPTION OF THE PREFERRED EMBODIMENT

Figure 1:
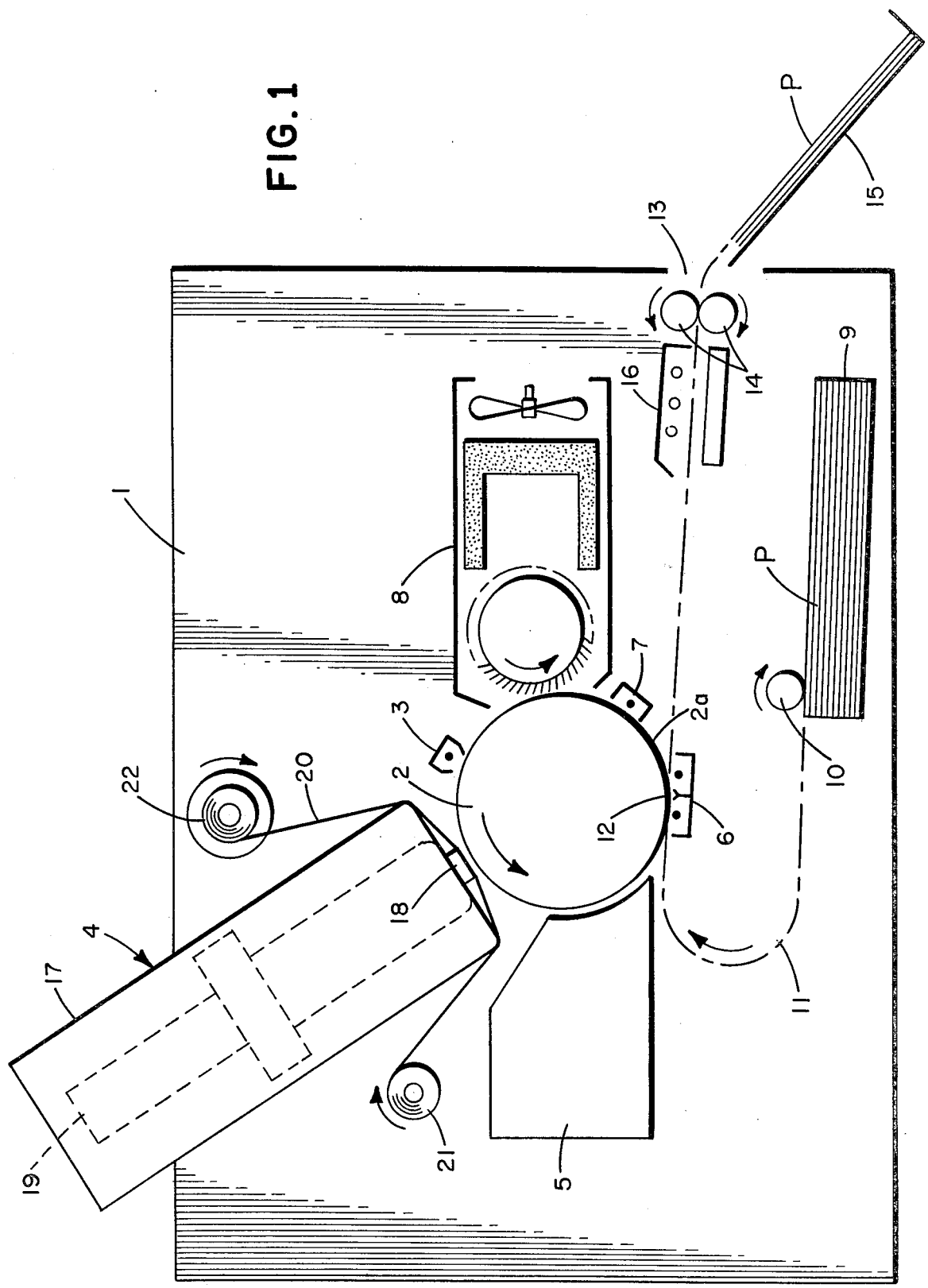
FIG. 1 is a diagrammatic view generally showing an electrostatic printer according to this invention.
Figure 2:
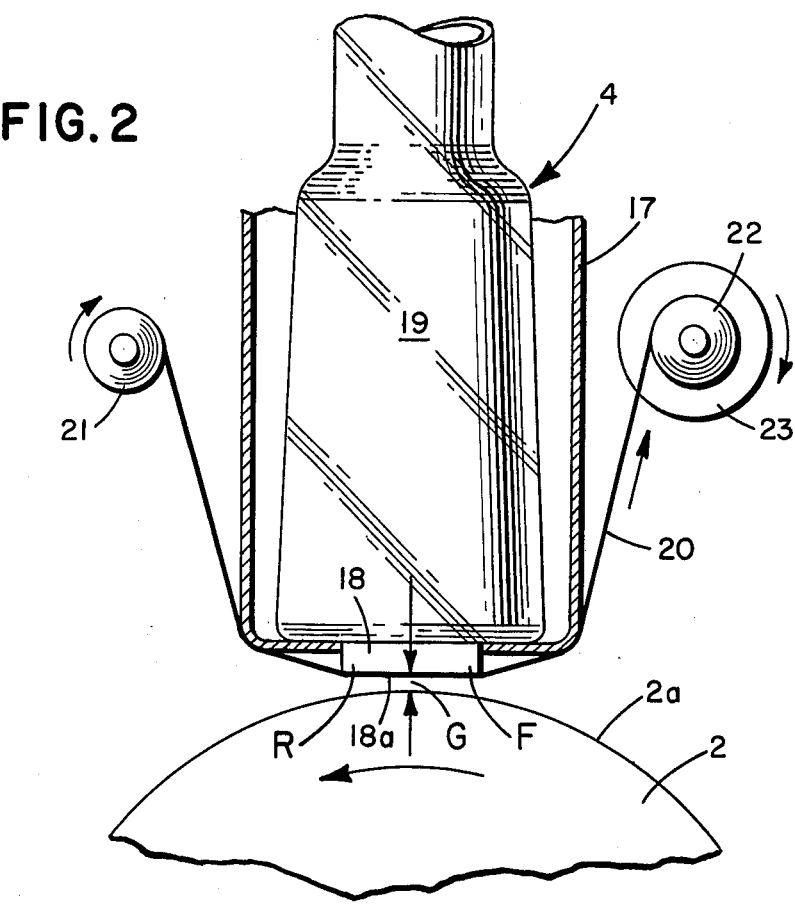
FIG. 2 is an enlarged view showing the OFT unit of the electrostatic printer of FIG. 1.

Referring now to FIGS. 1-5, an explanation will be given regarding a preferred embodiment of the invention. As shown in FIG. 1, a photosensitive drum 2 is located near the center of a printer body 1. A main charger 3, OFT unit 4, developing unit 5, transfer charger 6, discharger 7 and cleaning unit 8 surround the photosensitive drum 2. A paper supply cassette 9 is located inside the base of the printer body 1. Paper P is removed from cassette 9 sheet by sheet by paper supply roller 10 and fed along paper conveying path 11.

Figure 3:
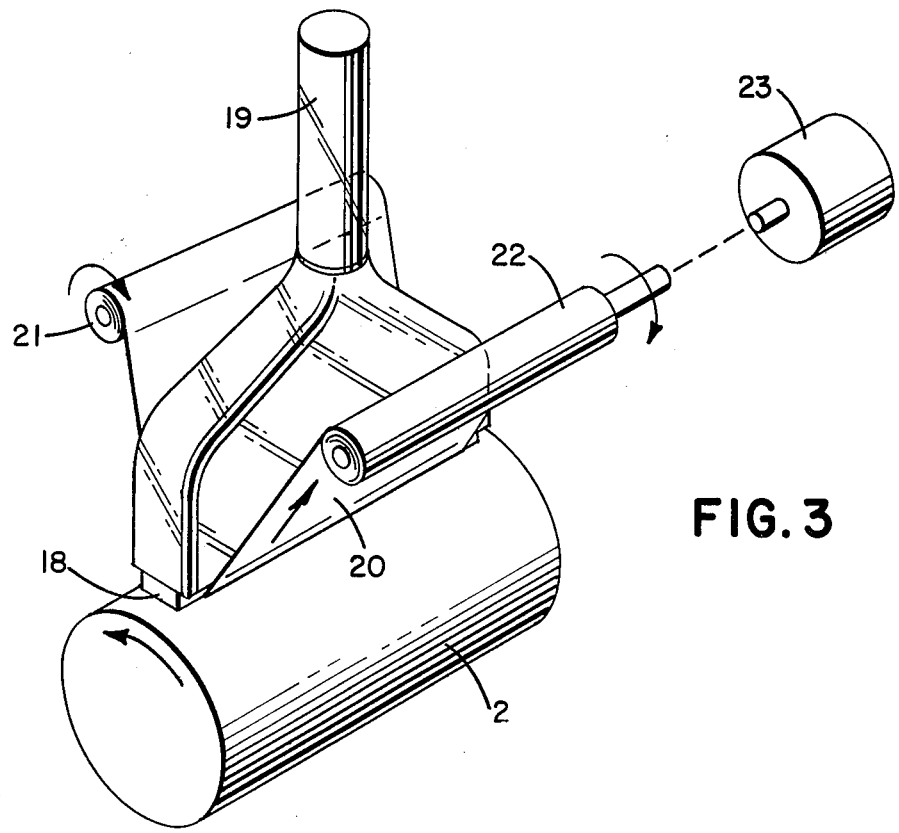
FIG. 3 is a perspective view showing the OFT unit of the electrostatic printer of FIG. 1.

The above mentioned OFT unit 4 comprises a case 17 and cathode ray tube (CRT) 19 mounted in the case 17 such that the head plate 18 of the CRT 19 projects outside the case 17. A gap G of about 0.1 to 0.2 mm is formed between the surface 18a of the head plate 18 of the OFT unit 4 and surface 2a of the photosensitive drum 2. A film 20 for preventing the contamination of the head plate 18 is interposed between the surface 18a of the head plate 18 and the surface 2a of the photosensitive drum 2. The film 20 has a thickness of 20 to 25 μm and it is formed of a transparent film such as polyester, polyamide, polypropylene or polyethylene. The film 20 is wound at one end on supply roller 21 and at the other end on takeup roller 22. The intermediate portion of the film 20 between these rollers passes substantially in a U-shaped form around an end portion of the OFT unit 4 to cover the surface 18a of the head plate 18. As shown in FIG. 3, the shaft of the takeup roller 22 is coupled to a motor 23. When the motor 23 is driven, the film 20 is taken up on the takeup roller 22 as it is fed past the head plate 18 in a direction opposite to the direction of movement of the surface of the photosensitive drum 2.

The operation of the electrostatic printer will be explained below. First of all, the printing process will be explained by referring to FIG. 1. The photosensitive drum 2 is rotated in the counterclockwise direction and the surface 2a of the photosensitive drum 2 is charged to several hundred volts by the main charger 3. The CRT 19 provides an optical image which is directed through the head plate 18 toward the surface 2a of the photosensitive drum 2. The portion of the photosensitive drum 2 illuminated by the light of the optical image is electrically discharged, which reduces the electrical resistance to form an electrostatic latent image. The electrostatic latent image on drum 2 rotates in front of the developing unit 5 to form a toner image on the surface 2a. A sheet of paper P is sent from the paper supply cassette 9 into the paper conveying path 11 in synchronism with the formation of the toner image on the surface 2a of the photosensitive drum 2. The sheet of paper P is passed through a transfer station 12 adjacent the surface 2a of the photosensitive drum 2. At this time, the toner image formed on the surface 2a is transferred to the paper P by the action of the transfer charger 6. The sheet of paper P is separated from the photosensitive drum 2 and conveyed to the paper outlet 13. On the way to the paper outlet 13, the toner image on the paper is fixed by the fixing unit 16. The fixed sheet of paper P is received by tray 15. After the toner image has been transferred to the paper, the surface of the photosensitive drum 2 faces the discharger 7 where the residual charge on the surface 2a is removed. Then, the surface of the drum 2 faces the cleaning unit 8 where the residual toner on the surface 2a is removed.

When the above printing process is carried out under high temperature and high relative humidity conditions, the charge of the toner can be lowered which results in the scattering of the toner particles. Moreover, residual toner may not be completely removed from the surface 2a of the photosensitive drum 2. Since a slight electrostatic charge is formed on the surface 18a of the head plate 18, and the gap G between the surface 18a of the head plate 18 of CRT 19 and the surface 2a of the photosensitive drum 2 is very small, there is a tendency for toner particles to adhere to the surface 18a of the head plate 18. However, the film 20 covers the surface 18a of the head plate 18 so that the toner adheres to the film 20, thus preventing contamination of the surface 18a of the head plate 18.

The film portion on the front side F of the head plate 18 contacts the residual toner earlier than the film portion on the rear side R of the head plate 18 resulting in a greater contamination of the film portion on the front side F. When the motor 23 is driven during the printing of one sheet of paper P, the takeup roller 22 is rotated a predetermined amount. The film 20 then is moved in a direction opposite to the direction of the surface 2a of the photosensitive drum 2. That is, the film is moved a predetermined amount past the head plate 18 so that the film portion on the front end F of the head plate 18 is moved ahead. As a result, the film portion which faces the head plate 18 is not contaminated which permits light to pass through the clean portion of the film 20. In this way, a clear image is formed on the photosensitive drum 2.

Because of the gap between the head plate 18 and the photosensitive drum 2, a different problem occurs with the electrostatic printer of the above construction. If the electrostatic printer is not used for some period of time after clean film is fed to cover the head plate 18, the film may stretch and sag. The sagging film could touch the surface 2a of the photosensitive drum 2 and become contaminated. In such a case, according to the present invention, the sagging is removed by driving the motor 23 to bring the film 20 into close contact with the head plate 18 before operation of the OFT unit 4.

Figure 4:
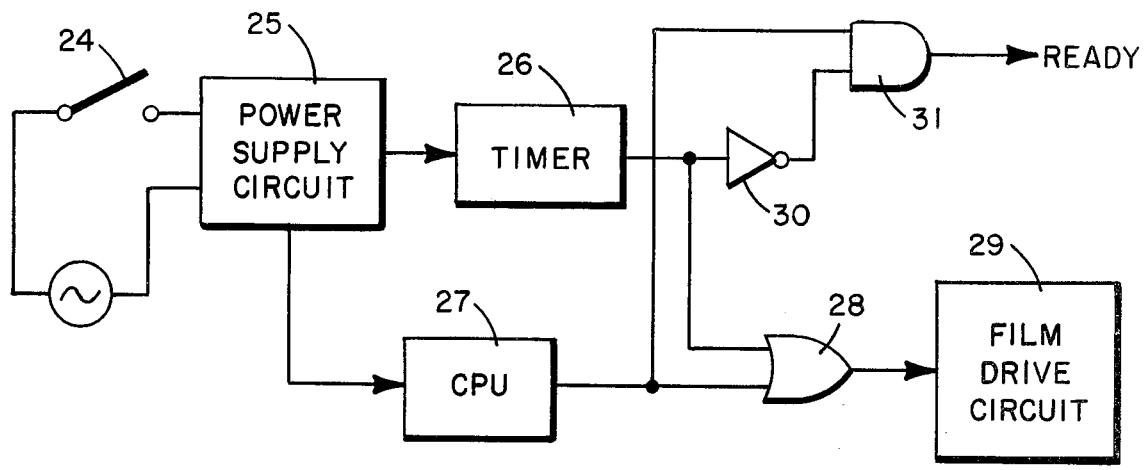
FIG. 4 is a block diagram showing a transparent film drive circuit for the electrostatic printer of FIG. 1.
Figure 5:
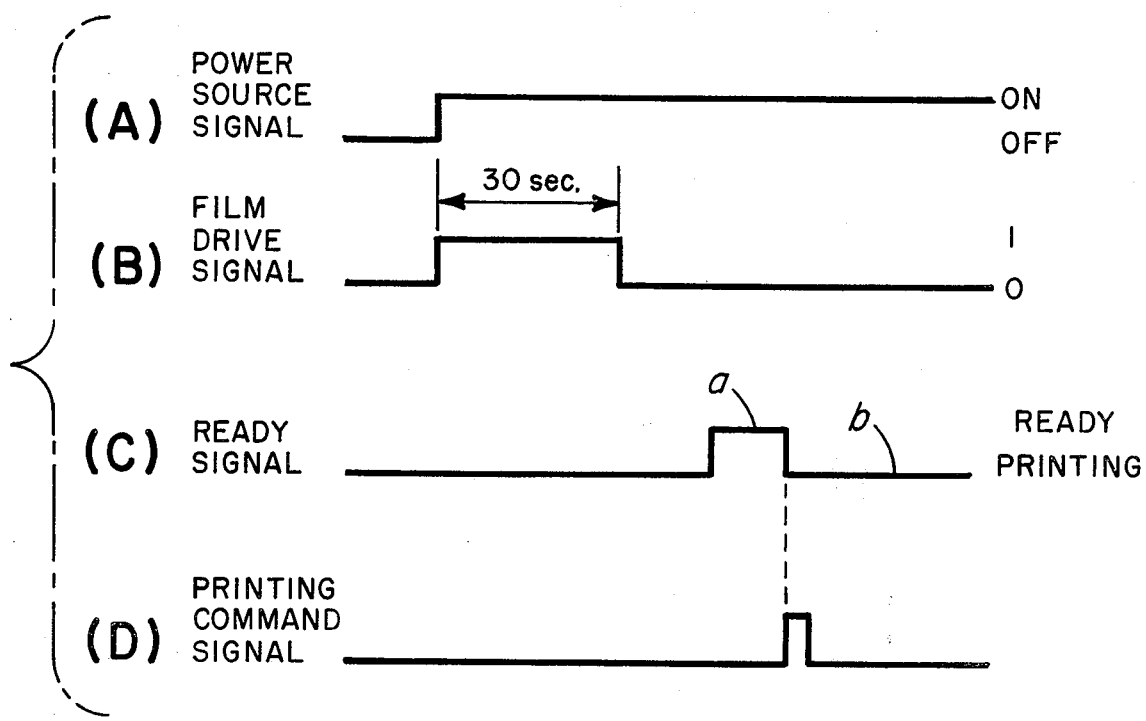
FIG. 5 is a timing chart illustrating the operation of the transparent film drive circuit.

The construction of a system for moving the film to remove sagging will now be described with reference to FIGS. 4 and 5. As shown in FIG. 4, when a power source switch 24 is closed, power is supplied though a power supply circuit 25 to a timer 26 and a printing process control circuit, such as CPU 27. The timer 26 produces a "1" signal for a sufficient period of time to remove sagging, for instance 30 seconds. The output signal from the timer 26 is coupled to an input terminal of an OR circuit 28. The OR circuit 28 also has another input terminal connected to receive a first output signal from the CPU 27. The output signal from the OR circuit 28 is coupled to a film drive circuit 29. The output signal of the timer 26 is also coupled to one input terminal of AND circuit 31 through inverter 30. The second input terminal of the AND circuit 31 receives a second output signal from the CPU 27.

With the electrostatic printer of the above construction, upon closing the power source switch 24, power is supplied through the power supply circuit 25 to the timer 26 and CPU 27 as shown in FIG. 5a. When the printing cycle is started some time after the closure of the power source switch 24, a "1" signal is produced by the timer 26 for 30 seconds as shown in FIG. 5b. The "1" signal is coupled to one input terminal of the OR circuit 28. The output signal from the OR circuit 28 operates the film drive circuit 29 to drive the motor 23. Upon driving the motor 23, the film 20 is taken up on the takeup roller 22 to bring the sagging film in close contact with the surface 18a of the head plate 18. Subsequently, a "0" signal is produced by the timer 26, inverted by the inverter 30, and coupled to one input terminal of the AND circuit 31. When the second output signal from the CPU 27 is coupled to the other input terminal of the AND circuit 31, a "READY" signal, as shown at (a) in FIG. 5c is produced to put the printer in a ready state. Then, when a printing command signal as shown in FIG. 5d is supplied upon the closure of a print start switch (not shown), the photosensitive drum 2 begins to rotate and the OFT unit 4 operates to produce an optical image. During time period (b) in FIG. 5c, the electrostatic latent image will be formed on the surface 2a of the photosensitive drum 2.

Although a preferred embodiment of the present invention has been described with reference to the drawings, it is apparent that various modifications may be made in the electrostatic printer by one skilled in the art without departing from the scope and spirit of the present invention.

I claim:
1. An electrostatic printer comprising:
  a movable photosensitive member;
  exposure means including a cathode ray tube for transmitting an optical image to said photosensitive member to form an electrostatic latent image on said photosensitive member and an optical plate connected to said cathode ray tube between said cathode ray tube and said photosensitive member, said optical plate being positioned a predetermined distance from said photosensitive member to form a gap;
  developing means for developing said electrostatic image by applying toner to said photosensitive member;
  transfer means for transferring the developed electrostatic image to paper;

a transparent film provided between said photosensitive member and said optical plate such that it covers and contacts said optical plate; and moving means for moving said transparent film to cover said optical plate with a clean toner free film portion, said moving means initially being actuated when power is supplied to said electrostatic printer before the formation of an electrostatic image on said photosensitive member.

2. The electrostatic printer of claim 1 wherein said moving means moves said transparent film in a direction opposite to the direction of movement of said photosensitive member.

3. The electrostatic printer of claim 1 wherein said moving means has a film drive circuit for driving said transparent film and a timer connected to said film drive circuit for operating said film drive circuit for a predetermined period of time.

* * * * *